July 18, 1961 F. V. ATKESON 2,992,747
PROTECTION OF SURFACES
Filed Oct. 11, 1957
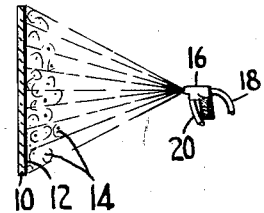
FIG. 1
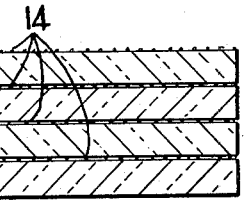
FIG. 2
FIG. 3
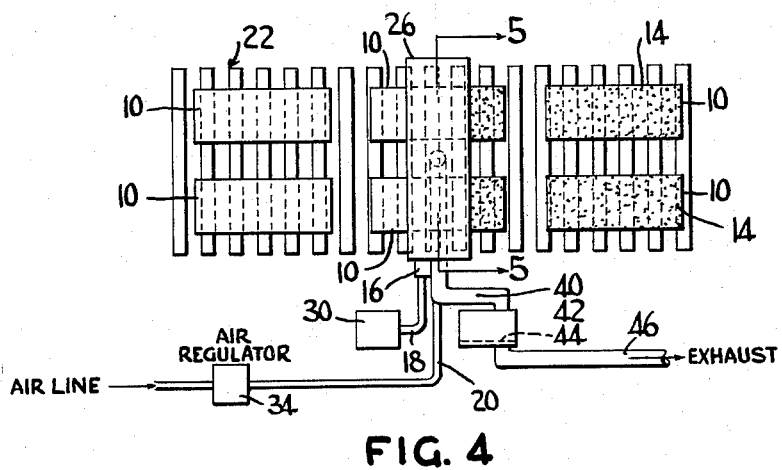
FIG. 4
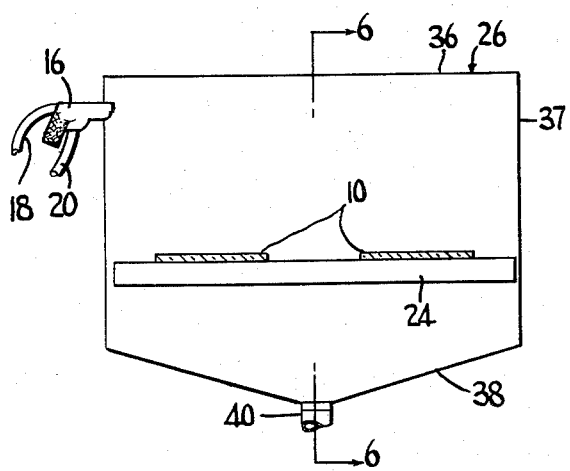
FIG. 5
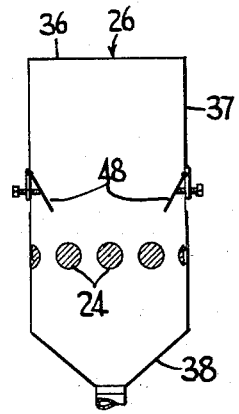
FIG. 6
INVENTOR.
FLORIAN V. ATKESON
BY
Oscar L. Spencer
ATTORNEY

2,992,747
PROTECTION OF SURFACES
Florian V. Atkeson, Springdale, Pa., assignor to Pittsburgh Plate Glass Company, Allegheny County, Pa., a corporation of Pennsylvania
Filed Oct. 11, 1957, Ser. No. 690,596
7 Claims. (Cl. 214—10.5)

The present invention relates to the protection of surfaces and more particularly to an improvement in parting materials applied to protect the surfaces of glass sheets that are to be stacked together for storage, shipment or other handling.

According to the present invention, certain calcined materials and mixtures containing these materials dispersed therethrough heretofore unused for such purposes, have been found to be especially suitable as parting materials for application to the surfaces of flat glass sheets prior to storing, handling or shipping. These glass sheets may be either single sheets or laminated. Furthermore, according to a modification of the present invention, mixtures of one or more of these parting materials with one or more suitable filling agents have been found advisable to provide additional mechanical cushioning beyond that provided by the parting material alone.

Previous parting materials have been uneconomical because of high labor costs required for their application and the high cost of the materials. In addition, these parting materials previously used did not prevent sleeking, rubbing and scratching of the glass surfaces when adjacent glass sheets in a stack on opposite sides of the parting material rubbed against the material relative to each other.

Previously, paper has been used as a parting material between glass sheets to minimize sleeking under such conditions. The use of paper has resulted in the formation of scum under adverse conditions involving either high humidity or changes in humidity and temperature conducive to the conversion of atmospheric moisture into a condensate on glass surfaces, especially when the glass has been stored for a considerable period of time.

The most common causes for rejection of glass sheets stored for a considerable period are scumming and staining. Scum is defined as the reaction product produced by moisture on the surface of stacked glass which may be removed by proper cleaning methods, such as polishing with pumice. Stain is the reaction product that remains after such cleaning treatment. Glass sheets separated by paper are subject to both staining and scumming upon storage.

Another parting material used previously is wood flour. While wood flour provides a suitable mechanical cushion between stacked glass sheets, the presence of this material between glass sheets does not prevent staining or scumming effectively. Another drawback to the use of wood flour is the difficulty of adhering particles of wood flour to glass.

According to the present invention, certain calcined salts from the class of hydrated light metal salts, whose water of crystallization is easily removable by heat and which have subsequent affinity for moisture at room temperatures, but which are not strong dessicants, have been found to be suitable parting materials. The reason for such suitability is that such salts pick up atmospheric moisture during the reconstitution of the hydrated salt molecules, and thus prevent the atmospheric moisture from staining or scumming the glass. The amount of water that is picked up by any salt of this type is limited to the reconstitution of the hydrated salt molecules. Thus, various salts in this class have various degrees of activity and efficiency.

Calcined borax, $Na_2B_4O_7$, is the most suitable parting agent yet discovered for the purpose described above, and it is preferred for long periods of storage under adverse humidity conditions. This material is preferred because its use eliminates both scum and stain to the extent that plates which have been stored under adverse conditions for considerable periods may be perfectly cleaned merely by flushing with cold water. The reason why borax is superior to other calcined salts of the general nature described is not known, but the use of borax as the parting material increases the time a stack of glass sheets may be stored without scumming by an appreciable amount.

Furthermore, mixtures of $Na_2B_4O_7$ with calcined gypsum, $CaSO_4$, ranging from about 25% to 100% $Na_2B_4O_7$ by volume, preferably in approximately 50-50 volume ratio, provide a more economical parting material that does not dilute the superior properties of the borax unduly. In such mixtures, the calcined gypsum provides a parting agent which is capable of absorbing and fixing within its molecular structure atmospheric moisture which normally diffuses down between plates of glass which are stacked together vertically, in such a way that such moisture is no longer available to produce stain on the glass surfaces, and the calcined borax reacts with the atmospheric moisture in a similar but more efficient manner to inhibit both staining and scumming.

Another advantage of the present parting materials is that it is not necessary to impart an electrostatic charge to the glass plates in order to adhere the particles of my parting material thereto in the manner required for certain prior art parting agents.

For storing glass sheets for a relatively short period on the order of a few weeks under favorable conditions in a dry atmosphere, the superior anti-staining and anti-scumming properties of calcined borax are superfluous and a suitable parting material for such purposes may be a 50-50 volume mixture of a less efficient calcined salt such as calcined gypsum and a neutral agent such as nylon floc.

In providing a parting material for laminated glass, it has been found advisable to include a filler material, such as nylon floc, a rayon floc, mica, talc and mixtures thereof, to provide additional mechanical cushioning beyond that provided by the metallic salts alone. Suitable mixtures of parting agents and filler material range up to about 50% by volume of the filler material, which is preferably a rayon floc. Higher concentrations of filler material are not desired because the filler dilutes the anti-staining action of the metallic salt. Lower concentrations of filler material may be used with discretion when less additional mechanical cushioning is desired. The filler materials need not have the anti-staining or anti-scumming properties of borax, but should be of a substance that does not of itself impart a scum or a stain to the glass, yet is readily adherent to glass in powdered form. At least 25% by volume of calcined borax is required in such mixtures to increase the time the parting material mixtures are effective to inhibit both stain and scum.

Accordingly, it is a purpose of the present invention to provide a family of materials for use as parting agents for flat glass which enables the glass to be stored, handled and shipped in large quantities without requiring undue volume of space to accommodate the large quantities of glass.

Another object of the present invention is to provide a simple and economical method and apparatus for application of such parting materials quickly, cheaply and efficiently.

These and other objects of the present invention will become apparent upon study of the following description together with the accompanying drawings.

In the drawings:

FIGURE 1 is a side view showing the method of application of the parting materials to an individual sheet of glass;

FIGURE 2 represents an isometric view of a stack of glass sheets after treatment;

FIGURE 3 is a cross-sectional view of the stacks shown in FIGURE 2 taken along the lines 3—3 of FIGURE 2;

FIGURE 4 is a plan schematic view of an apparatus for imparting the parting material to a surface of glass sheets;

FIGURE 5 is a sectional view taken along the lines 5—5 of FIGURE 4; and

FIGURE 6 is a sectional view taken along the lines 6—6 of FIGURE 5.

As shown in FIGURE 1, a glass sheet 10 has a surface 12 with a suitable parting material 14 of the kind described above applied thereon by means of a hand operated spray gun 16. The latter is provided with two pipes 18 and 20, one for the introduction of the pulverized calcined parting material and the other for the application of dry air under pressure. A fine dry spray of parting material or of a mixture of parting material and filler is brought through the nozzle of the gun toward the surface 12. Parting material 14 adheres to the glass sheet surface 12 and provides suitable space between adjacent surfaces of flat glass sheets, 10A, 10B, 10C, 10D, etc.

In commercial production, individual glass sheets ready for packaging, storing or shipping are successively conveyed in front of the spray gun 16, a dry spray or dust is applied, and then the sheets are ready for packing, storing or packaging prior to shipping.

The individual particles of parting material 14 are so small they are nearly invisible to the naked eye and yet are large enough to provide a separation between adjacent glass sheets. Thus, the tendency of sheets to scratch each other by rubbing is minimized due to the bearing effect provided by the particles 14 of the pulverized calcined salts and, to a greater degree, by the particles of filler materials used in mixtures with calcined salts. Furthermore, the ability of my present parting materials to absorb a certain amount of atmospheric moisture enables the stacks of sheets to be stored for a much longer period than was formerly possible with previously used parting materials, which neither accelerate nor retard staining and scumming of stacked glass sheets.

A typical apparatus for applying a parting material will now be described with reference to FIGURES 4, 5 and 6. A conveyor 22 provided with a plurality of conveyor rolls 24 is used to convey a plurality of glass sheets 10 through a housing 26. A spray gun 16 is connected by lines 18 and 20 to a container 30 containing an agitated mixture of dry parting material and a dry air source, respectively. The parting material in the container 30 is agitated to maintain a homogeneous dispersion by a mechanical agitator. An air regulator valve 34 is provided in the pressure feed line 20 to the spray gun 16 to regulate the air pressure applied to the spray gun. The spray gun 16 thus imparts a dry pulverized spray of parting material within the dispenser housing onto the upper surface of the plates 10 as the latter pass through the housing along a horizontally disposed conveyor.

Housing 26 is provided with a roof 36, walls 37 and a tapered floor 38. An air exhaust outlet pipe 40 is connected to the bottommost portion of the tapered floor 38 of the housing 26. Outlet pipe 40 leads to a collection chamber 42 provided with a filter 44. An exhaust line 46 is attached to chamber 42. The suspended parting material particles that do not coat the plates 10 passing through the dispenser housing are exhausted through the outlet pipe 40 and into the chamber 42. Air is exhausted from the chamber after the particles of parting material have been filtered from the air passing through the chamber to the exhaust line. One or more filters 44 are provided to insure that the parting material is not exhausted from the chamber 42. Thus, the unused parting material may be recovered for reuse from the recovery chamber.

The walls 37 are provided with adjustable baffle plates 48 that tend to direct the distribution of the particles of parting material toward the central portion of the housing 26 and thus facilitate evacuation of the excess parting material through the outlet exhaust pipe 40. The provision of the housing protects personnel from the bad effects of dust inhalation.

The particular embodiments described herein are for purposes of illustration and not limitation. The scope of the present invention is restricted only by the accompanying claims.

This application is a continuation-in-part of my copending and abandoned application Serial No. 417,863, entitled Protection of Surfaces, filed March 22, 1954.

I claim:

1. In the art of handling glass articles, the improvement comprising applying to a surface of a glass article a parting material nonabrasive to and nonreactive with glass and containing between about 50% and 100% by volume of particles of calcined material and about 50% to 0% by volume of particles of a filler material which neither abrades the glass nor reacts chemically therewith and thereafter stacking the articles in such a manner that adjacent surfaces of abutting glass articles are separated by the parting material, said particles of calcined material consisting essentially of between 25% and 100% by volume of particles of calcined borax and between 0% and 75% by volume of particles of calcined gypsum.

2. An article of manufacture comprising a stack of glass sheets and a parting material between adjacent sheets, said parting material consisting essentially of at least about 50% by volume of particles of a calcined material and particles of an inert mechanical cushioning material, said particles of calcined material consisting essentially of between 25% and 100% by volume of particles of calcined borax and between 0% and 75% by volume of particles of calcined gypsum and said cushioning material being present in a sufficient amount up to about 50% by volume of the parting material to provide a greater mechanical cushioning property for said parting material than provided solely by said calcined material.

3. The article of manufacture of claim 2 wherein the inert filler material is nylon floc.

4. The article of manufacture of claim 2 wherein the filler material is rayon floc and constitutes about 50% by volume of said parting material.

5. The article of manufacture of claim 2 wherein the filler material is mica.

6. In the art of handling glass sheets, the improvement comprising applying to a surface of a glass sheet a parting material consisting essentially of about 50% by volume of particles of calcined borax and about 50% by volume of nylon floc and thereafter stacking the articles in such a manner that adjacent surfaces of the abutting glass sheets are separated by the parting material.

7. In the art of handling glass sheets, the improvement comprising applying to a surface of a glass sheet a parting material consisting essentially of about 50% by volume of particles of calcined borax and about 50% by volume of rayon floc and thereafter stacking the articles in such a manner that adjacent surfaces of the abutting glass sheets are separated by the parting material.

References Cited in the file of this patent

UNITED STATES PATENTS

| | | |
|---|---|---|
| 47,040 | Richards | Mar. 28, 1865 |
| 343,695 | Boblett | June 15, 1886 |
| 451,519 | Reagan et al. | May 5, 1891 |
| 499,710 | Bronson | June 20, 1893 |
| 539,745 | Kellogg | May 21, 1895 |

(Other references on following page)

UNITED STATES PATENTS

| | | |
|---|---|---|
| 566,833 | Woltersdorf | Sept. 1, 1896 |
| 658,590 | Robinson | Sept. 25, 1900 |
| 684,091 | Platt | Oct. 8, 1901 |
| 1,293,186 | Perry | Feb. 4, 1919 |
| 1,659,971 | Colton | Feb. 21, 1928 |
| 1,858,369 | Linzell | Mar. 17, 1932 |
| 2,113,764 | Macht | Apr. 12, 1938 |
| 2,357,068 | Barab | Apr. 29, 1944 |
| 2,476,145 | Gwyn | July 12, 1949 |
| 2,539,514 | Jenett | Jan. 30, 1951 |
| 2,628,153 | Noyes et al. | Feb. 10, 1953 |
| 2,629,907 | Hugger | Mar. 3, 1953 |
| 2,699,401 | Grossi | Jan. 11, 1955 |

FOREIGN PATENTS

| | | |
|---|---|---|
| 102,375 | Australia | Nov. 11, 1937 |
| 394,635 | Great Britain | June 29, 1933 |
| 455,457 | Great Britain | Oct. 21, 1936 |

OTHER REFERENCES

Thorpe's Dictionary of Applied Chem., 4th ed. (1938), pp. 49 and 50.